Feb. 22, 1938.  J. V. SCHAFER  2,109,035
JEWEL MOUNT
Filed July 29, 1935
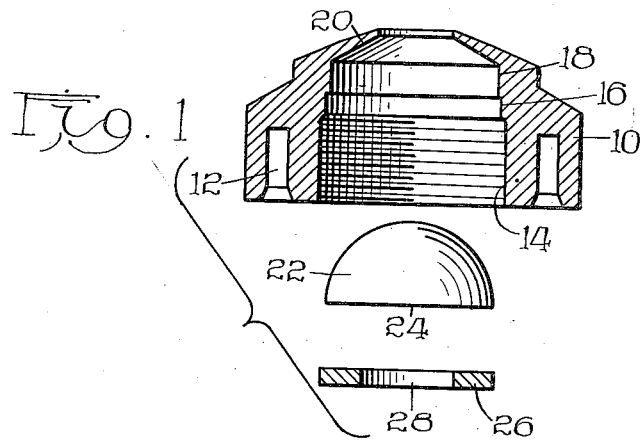
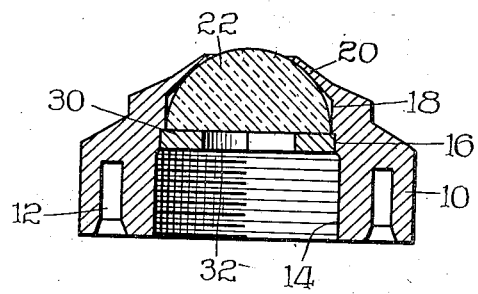
Inventor;
John V. Schafer
By Freeman, Sweet, Albrecht & Weidman
Attorneys Patented Feb. 22, 1938

2,109,035

UNITED STATES PATENT OFFICE 2,109,035

JEWEL MOUNT

John V. Schafer, Bronson, Mich., assignor to Bronson Reel Company, Bronson, Mich., a corporation of Michigan Application July 29, 1935, Serial No. 33,740

3 Claims. (Cl. 308—163)

My invention relates to fishing reels and includes among its objects and advantages an improvement in the bearings of a fishing reel.

Because an extremely small degree of friction in the bearings of a reel is essential to free and easy casting, it is customary to support the spool pivots against lateral motion in a carefully fitted cylindrical bearing of minimum diameter consistent with strength and to take care of end play by contact between the end of the spool pintle and a jewel.

In the accompanying drawing:

Figure 1 is a section of the parts of an unassembled jewel and mount employing one type of identifying retaining washer; and Figure 2 is a section of an assembled jewel and mount identical with those of Figure 1 except for a different identification on the washer.

According to the invention, the mount comprises an annular body 10 which may be apertured as at 12 or otherwise suitably adapted for assembly with other parts. The body 10 is threaded at 14 for adjustable support on the outer threaded end of a fixed structure providing a cylindrical bearing for the spool pintle (not shown). Beyond the threaded portion is a first cylindrical portion 16 and a second cylindrical portion 18 followed by a conical portion 20 of relatively thin metal. The jewel 22 is usually of substantially hemispherical form with a flat working surface at 24. Into the completed body of Figure 1 the jewel is thrust by pressure exerted against the face 24 through the washer or seal 26. The machine or press performing this operation is adjusted to force the seal home against the shoulder between the cylindrical portions 16 and 18. During assembly, the cylindrical portion 18 has peripheral contact with the jewel to guide it home, and the body of the jewel bends the lip 20 up to the position of Figure 2. The machine forces the seal into the annular space 16, which is machined so as to be a press fit on the seal, and when the seal strikes the shoulder, the operation is complete.

The seal 26 has a cylindrical central opening at 28 to afford the shaft end access to the working surface at 24, whereas the seal 30 of Figure 2 has a square opening at 32. It is customary to use different grades of jewel for high priced and low priced reels, and the use of such a seal makes it possible to use openings of different shapes and have a particular shape of opening correlated with each grade of jewel.

A more important advantage is the elimination of breakage. In the prior art the bodies have been formed with outwardly facing shoulders to receive the edge of the working face 24, and then the portion corresponding to the lip 20 in the finished assembly was spun over into place. The spinning operation was difficult to perform without cracking a good many of the jewels, and it left the metal of the lip under almost negligible residual stress.

The movement of the jewel and washer to the position of Figure 2 loads the lip 20 beyond its elastic limit and bulges it out by plastic flow. When the force of the press is withdrawn, the force of the lip 20, exerted through the jewel against the washer, is transferred from the punch of the press to the washer. Under this new load, the washer will yield by an amount of the order of magnitude of a few hundred thousandths of an inch, but sufficiently to reduce the residual stress in the lip 20 materially below the elastic limit of the metal. In this condition, the metal parts are under the residual stresses best suited to tight retention of the jewel throughout the life of the equipment.

Without further elaboration the foregoing will so fully explain my invention that others may, by applying knowledge current at the time of application, readily adapt the same for use under various conditions of service.

I claim:

1. A jewel thrust bearing comprising: a jewel proper having a working surface and a convex surface, facing in opposite directions; a main annular support having a bore adapted to receive the entire jewel, and a conical lip at one end of said bore; said lip fitting said convex surface and being in the condition of internal stress resulting from being bulged out by axial thrust to fit said convex surface; and an annular retaining ring abutting the outer portion of said working surface; said ring being of greater diameter than said bore; said support having an enlarged bore fitting said ring; and an annular abutment shoulder joining said large and small bores.

2. A jewel thrust bearing comprising: a jewel proper having a working surface and an inactive surface facing in opposite directions; an annular support receiving said jewel, substantially without distortion; an annular lip integral with said support and engaging said inactive surface, said lip being in the state of stress resulting from being distorted beyond its elastic limit by the insertion of said jewel; and means for retaining said jewel in assembled position.

3. A jewel bearing comprising: a jewel proper; a metallic holder embracing said jewel, said holder including a portion pressing against said jewel in the condition of stress resulting from being distorted beyond its elastic limit by assembly of said jewel in said holder.

JOHN V. SCHAFER.